P. ROBERT.
HEATING SYSTEM.
APPLICATION FILED MAY 19, 1911.

1,083,859.

Patented Jan. 6, 1914.
2 SHEETS—SHEET 1.

WITNESSES

INVENTOR
Philippe Robert
BY
ATTORNEYS

P. ROBERT.
HEATING SYSTEM.
APPLICATION FILED MAY 19, 1911.

1,083,859.

Patented Jan. 6, 1914.
2 SHEETS—SHEET 2.

WITNESSES
J. P. Davis

INVENTOR
Philippe Robert
BY
ATTORNEYS

UNITED STATES PATENT OFFICE.

PHILIPPE ROBERT, OF PARIS, FRANCE.

HEATING SYSTEM.

1,083,859.  Specification of Letters Patent.  Patented Jan. 6, 1914.

Application filed May 19, 1911.  Serial No. 628,235.

*To all whom it may concern:*

Be it known that I, PHILIPPE ROBERT, of 54 Rue Lepic, Paris, France, have invented certain new and useful Improvements in Heating Systems, of which the following is a specification.

This invention has for its object an arrangement for generating pressure and maintaining the same in steam generators without the use of fuel and the invention may be applied for instance to the so-called mixed electric plants, comprising electric machines combined with hydraulic and steam engines.

The particular object is to store in the form of heat accumulated in a steam generator or one or more thermic accumulators, the energy which has not been utilized during the working period of the machines ordinarily supplied with another source of power, the purpose of this being to restore at any required moment the energy or power thus stored and to utilize the same in order to operate the above mentioned machines.

Now, the invention mainly consists in employing one or more thermic accumulators with an independent heating appliance such as a steam generator having electric resistances loaded with the excess, not utilized, of the current supplied by another source of power, as often happens in hydro-electric plants for lighting purposes or in power plants, the generator being arranged in such manner as to supply the accumulator by means of a circulating pump, so that it becomes possible to generate and maintain without the use of fuel the pressure in said accumulator as well as in a steam generator or generators to which it is connected.

Figure 1:
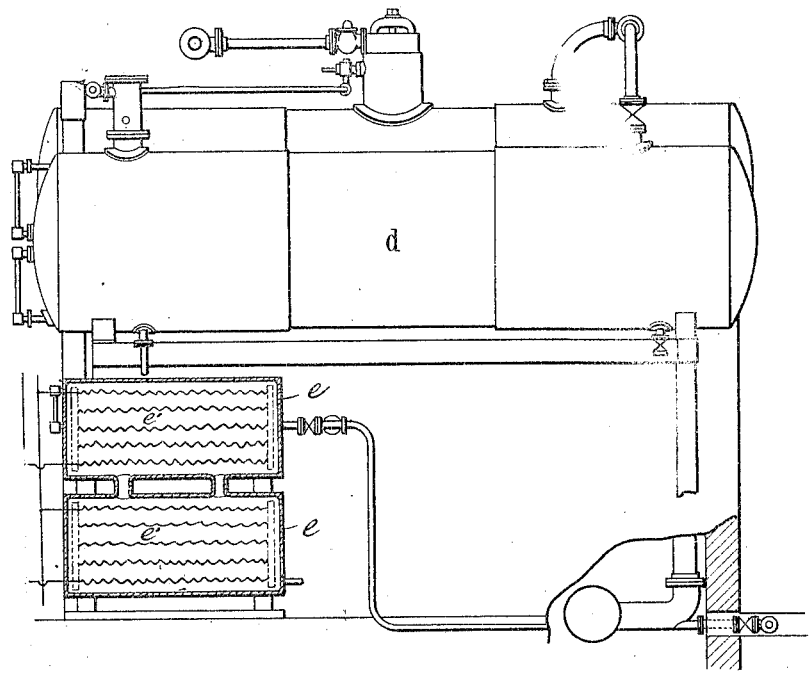
Figure 4:
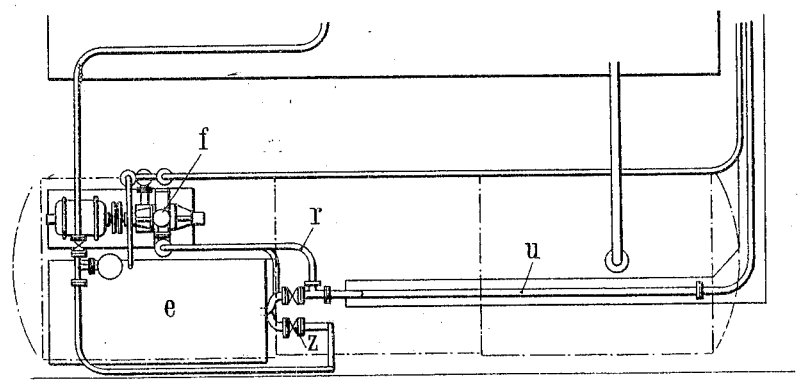
Figure 2:
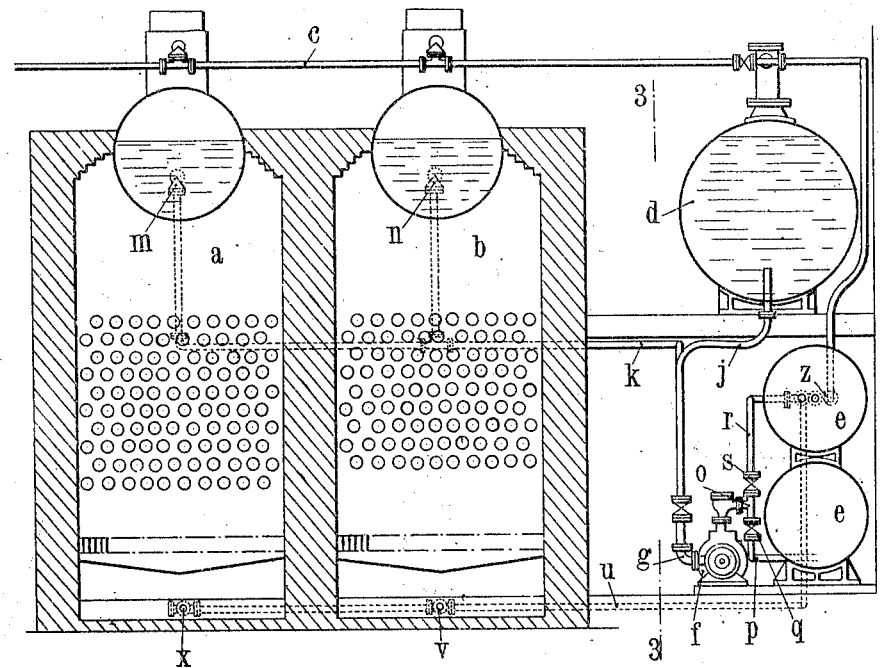
Figure 3:
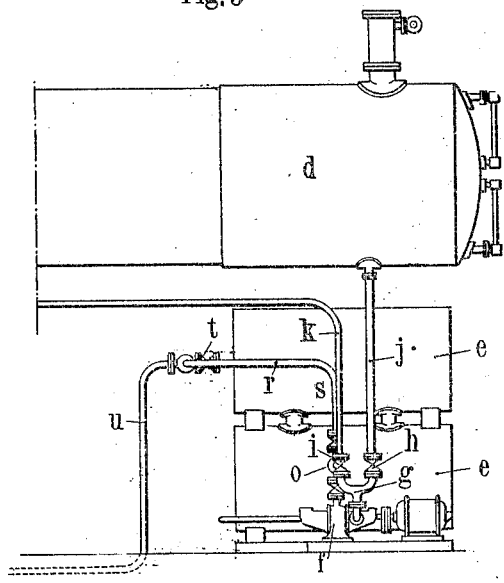

In the accompanying drawings, which are intended to show the invention applied to the generator plant of an auxiliary steam engine shop appertaining to an electro-hydraulic plant: Figure 1 is a side elevation of the plant, Fig. 2 is a cross section of the same, Fig. 3 is a section through line 3—3 of Fig. 2, Fig. 4 is a plan view of part of the apparatus.

The generator plant has steam generators $a$ $b$ provided with a common supply pipe $c$ said generators being connected with an accumulator $d$ placed in proximity to steam generators $e$ having electric resistances $e'$. A circulating pump $f$ is provided with a suction pipe $g$ which is connected on one hand by means of cock $h$, to the pipe $j$, leading from the lower part of the accumulator $d$ and on the other hand by means of the cock $i$ to the pipe $k$, which can be connected, through cocks $m$ and $n$, respectively to the steam generators $a$ and $b$. The discharge pipe $o$ of pump $f$ communicates by means of a pipe $p$ and a cock $q$ with the lower part of the steam generator $e$, and by means of a pipe $r$ provided with cock $s$, with the upper part of this steam generator on which is placed a cock $t$; or the discharge pipe of the pump communicates with a pipe $u$, leading to cocks $v$, $x$, placed at the lower part of the steam generators $a$ and $b$.

The working is as follows: The steam generators $a$ and $b$, are filled up to a certain level, as well as the accumulator $d$, by means of supply valves placed at their upper side. During the night and during certain moments of the day, when the current supplied by the hydro-electrical station is not used in totality, the excess of the current is sent into the steam generator $e$ having electrical resistances $e'$ for heating the water. Then the circulation pump $f$, is started, the cocks $i$, $m$, $n$ and $q$ being open. The water sucked from the steam generators $a$ and $b$ through the pipe $k$, goes through the pump and passes out by the pipe $p$, flowing into the lower part of the steam generator $e$, where it becomes heated. It leaves the upper part of the steam generator $e$ through the cock $t$ and passes into the steam generators $a$ and $b$, through the pipe $u$ and the cocks $v$ and $x$. Thus inside of the generators $a$ and $b$ a circulation is established until the water contained therein reaches a temperature corresponding to the desired pressure. The cocks $m$, $n$, $i$, $t$, $v$ and $x$ are then closed thus interrupting all communication of the electrical steam generator $e$ with the principal steam generators $a$ and $b$. Then the suction valve $h$ of the pump is opened, as well as the cock $z$ placed on the top part of the electrical steam generator $e$. The cold water is then drawn by the pump through the pipe $j$ from the lower part of the accumulator $d$ and is discharged into the steam generator $e$. From the steam generator $e$ the heated water passes back to the accumulator through the cock $z$ and the pipe leading from the cock $z$ to the top of the accumulator. This circulation in the accumulator is stopped when the water contained in the accumulator reaches a proper temperature. It is enough then to send into the electrical steam generator $e$, a very small quantity of current, in order to maintain pressure in the accumulator and the steam generators $a$ and $b$, by alternating properly the above described operations.

If the hydro electrical plant should be damaged, or for any cause get out of order so as to necessitate the work being done by the generator plant of the auxiliary steam engine shop, the fires of the steam generators $a$ and $b$ are lighted, and the motors operated by these steam generators can be supplied by simply opening the stop cocks of the steam generators or accumulators, the difference of pressure existing between these machines and the pressure of admission to the motor that they have to supply produces a spontaneous vaporization of the water at a pressure sufficient for feeding the motor until the fire places are in full action, which is obtained very rapidly on account of the high temperature of the water contained in the machines from the start of the lighting up.

This device can be used to increase at a given moment the motive power supplied by the auxiliary generator plant. For that purpose at the time when the greatest power is required the steam generators $a$ and $b$ are fed with the water contained in the accumulator, which is already brought to a high temperature, which augments considerably the power of vaporization of these steam generators. During each utilization of these principal steam generators $a$ and $b$, the generator $c$ with electrical resistances is placed out of the circuit in order to prevent the waste of heat, which would be produced by a useless heating of the water it contains.

The advantages are the following: The combination of the accumulator with a steam generator heated by means of electricity, making use only of the current in excess, and which would be lost otherwise, permits of economy in the operation, since the steam generators $a$ and $b$ can be constantly kept under pressure without any expenditure of fuel.

The electrical steam generators $c$ can be instantly isolated, when the main generators $a$ and $b$ are started for work, which also results in economy, as the main generators will not then be compelled to heat the water contained in these electrical steam generators.

An accumulator, of a construction different from the one represented, may be employed and also the steam generator combined with this accumulator might be of a model different from that represented. It would also be possible to employ for that purpose a steam generator with any kind of heating, although the arrangement described is preferable on account of its economy.

The steam generators as well as the thermic accumulator can contain instead of water any kind of liquid or solution.

The connection between the steam generator having the electrical resistances, the accumulator and the steam generators $a$ and $b$ can be made through a rotary or other pump or any other way, a suitable motor being employed for driving the pump.

The invention can be applied in all cases when a motive power plant is employed to operate intermittently apparatuses at auxiliary stations more or less distant, as is the case for example in the so called mixed hydro-electrical stations. When the invention is applied to non-electrical plants, the excess of motive power free at certain moments can be employed to supply the steam generators and auxiliary thermic accumulators.

Having now particularly described and ascertained the nature of my said invention and in what manner the same is to be performed, I declare that what I claim is:

1. The combination with a steam generator power plant having main generators ($a$—$b$), of means for generating and maintaining pressure in the main generators without the use of fuel therein, consisting of a thermic accumulator ($d$), an auxiliary steam generator ($c$), means for heating the auxiliary steam generator, pipe connections between the auxiliary generator ($c$) and the main generators, pipe connections between the auxiliary generator and the heat accumulator, a rotary pump in the pipe connections for circulating in the main generators and the heat accumulator, the water heated in the auxiliary generator, and a motor for driving the pump.

2. In an apparatus of the character described, a main generator, a thermic accumulator, an auxiliary steam generator, means for heating the auxiliary steam generator, circulating means connecting the auxiliary steam generator with the accumulator and the main generator to heat the liquid contained in said accumulator and said main generator, and means for leading the heated liquid from the accumulator into the main generator.

In testimony whereof I have hereunto placed my hand at London this ninth day of May 1911.

PHILIPPE ROBERT.

In the presence of—
WM. BUXTON,
R. WESTACOTT.